(12) United States Patent
Lee

(10) Patent No.: US 7,611,166 B2
(45) Date of Patent: Nov. 3, 2009

(54) LOCKING STRUCTURE OF TILTING AND TELESCOPIC STEERING COLUMN

(75) Inventor: Donghan Lee, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 203 days.

(21) Appl. No.: 11/965,478

(22) Filed: Dec. 27, 2007

(65) Prior Publication Data

US 2009/0120145 A1    May 14, 2009

(30) Foreign Application Priority Data

Nov. 13, 2007    (KR) ...................... 10-2007-0115341

(51) Int. Cl.
*B62D 1/18* (2006.01)
(52) U.S. Cl. ........................ 280/775; 74/493
(58) Field of Classification Search ................. 280/775; 74/493

See application file for complete search history.

(56) References Cited

U.S. PATENT DOCUMENTS

| 4,723,461 | A * | 2/1988 | Yoshida et al. ................. 74/493 |
| 2001/0029802 | A1 * | 10/2001 | Bowerman et al. ............ 74/493 |
| 2005/0189756 | A1 * | 9/2005 | Ridgway et al. ............. 280/775 |
| 2007/0068310 | A1 * | 3/2007 | Arihara ........................ 74/493 |
| 2007/0137381 | A1 * | 6/2007 | Arihara ........................ 74/493 |
| 2007/0235998 | A1 * | 10/2007 | Demmon et al. ............ 280/775 |
| 2008/0217900 | A1 * | 9/2008 | Ozsoylu et al. ............. 280/775 |
| 2008/0257097 | A1 * | 10/2008 | Graf ............................ 74/493 |
| 2009/0114056 | A1 * | 5/2009 | Nashef et al. ................. 74/493 |

FOREIGN PATENT DOCUMENTS

| JP | 2000-43738 | 2/2000 |
| JP | 2002-87285 | 3/2002 |
| JP | 2004-82868 | 3/2004 |
| JP | 2006-69524 | 3/2006 |

* cited by examiner

*Primary Examiner*—Ruth Ilan
(74) *Attorney, Agent, or Firm*—Morgan, Lewis & Bockius LLP

(57) ABSTRACT

A locking structure of a steering column. A main housing is provided around a steering shaft and fixed to a car body. An insert pipe protrudes from the main housing. A sliding housing has an arc portion surrounding the insert pipe, a tightening block at each end, and a variable inner cross-section that changes with distance between the tightening blocks. An upper housing is tiltable relative to the sliding housing. A tilt plate is fixed to the upper housing, extends to the tightening block, and has an arc-shaped slot corresponding to a rotation distance of the tilt plate. A locking bolt passes through the arc-shaped slot of the tilt plate and through the tightening blocks. An operation lever is rotatably fitted on the locking bolt. A cam assembly variably applies a force to the tilt plates and the tightening blocks according to a rotation distance of the operation lever.

4 Claims, 4 Drawing Sheets

F I G . 2
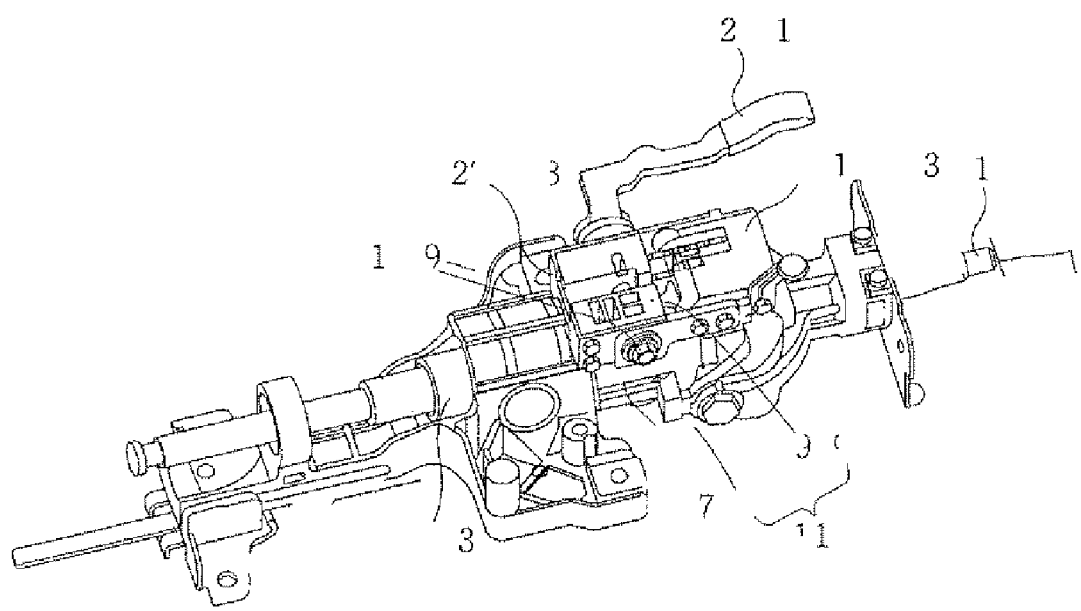

LOCKING STRUCTURE OF TILTING AND TELESCOPIC STEERING COLUMN

CROSS-REFERENCE TO RELATED APPLICATIONS

The present application is based on, and claims priority from, Korean Application Serial Number 10-2007-0115341, filed on Nov. 13, 2007, the disclosure of which is hereby incorporated by reference herein in its entirety.

FIELD OF THE INVENTION

The present invention relates to a locking structure of a lilting and telescoping steering column.

BACKGROUND OF THE INVENTION

A lever is commonly used to manually tilt or telescope a steering column. One piece restricts tilting, and separate piece restricts telescopic operation. The lever is connected to the piece that restricts telescopic operation, and a cable is used for the lever to control the piece that restricts tilting.

The large number of components provides high weight and cost. Further, the performance is sensitive to the quality of the cable.

The above information disclosed in this Background section is only for enhancement of understanding of the background of the invention and therefore it may contain information that does not form the prior art that is already known in this country to a person of ordinary skill in the art.

SUMMARY OF THE INVENTION

A locking structure of a steering column is disclosed. A main housing is provided around a steering shaft and fixed to a car body. An insert pipe protrudes backward from the main housing. A sliding housing has an arc portion surrounding the insert pipe, a tightening block at each end, and a variable inner cross-section that changes with changes in distance between the tightening blocks. An upper housing is tiltable relative to the sliding housing. A tilt plate is fixed to the upper housing, extends to a side of the tightening block of the sliding housing, and has an arc-shaped slot corresponding to a rotation distance of the lilt plate relative to the tightening block. A locking bolt passes through the arc-shaped slot of the tilt plate and through the tightening blocks. An operation lever is rotatably fitted on the locking bolt. A cam assembly variably applies a force to the tilt plates and the tightening blocks according to a rotation distance of the operation lever.

A guide bracket may be provided to cover the front and both sides of the tightening blocks of the sliding housing. The tilt bracket may be disposed between the tightening block and the guide bracket. An additional tilt plate may be provided outside the tilt plate, fixed to the upper housing, and may have an arc-shaped slot at a portion of the additional tilt plate that is in contact with the guide bracket. The locking bolt may pass through the guide bracket and the additional tilt plates.

The guide bracket may be U-shaped. The locking bolt may pass through a rear portion of the tightening block, and a front portion of the tightening block may be fixed to the guide bracket by a bolt.

The cam assembly may include a fixed cam through which the locking bolt passes, and a portion of which is inserted in the arc-shaped slot of the additional tilt plate to prevent rotating; and a movable cam that is in contact with the fixed cam, such that the movable cam moves towards or away from the fixed cam while rotating relative to the fixed cam, and is rotated by the operation lever.

BRIEF DESCRIPTION OF THE DRAWINGS

For better understanding of the nature and objects of the present invention, reference should be made to the following detailed description with the accompanying drawings, in which:

FIG. 2 is a bottom view of the locking structure of FIG. 1;

DETAILED DESCRIPTION OF THE PREFERRED EMBODIMENTS

Figure 1:
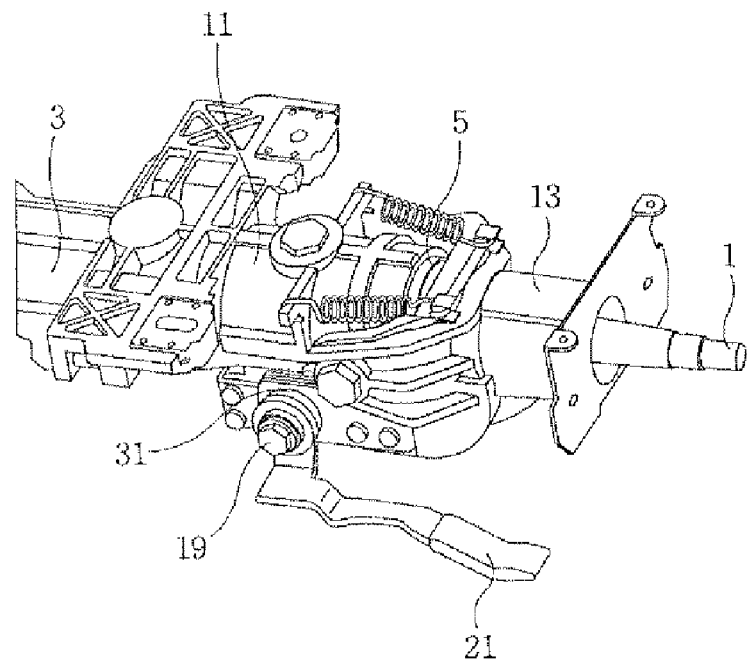
FIG. 1 is a perspective view of a locking structure of a tilting or telescopic steering column according to an embodiment of the invention.
Figure 3:
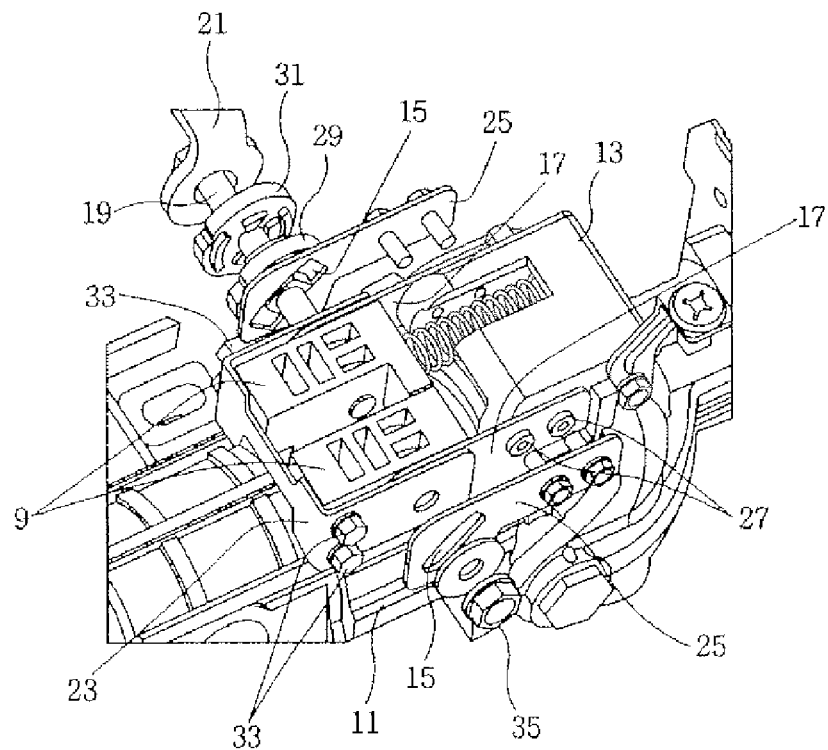
FIG. 3 is an enlarged perspective view of a portion of the locking structure of FIG. 1.
Figure 4:
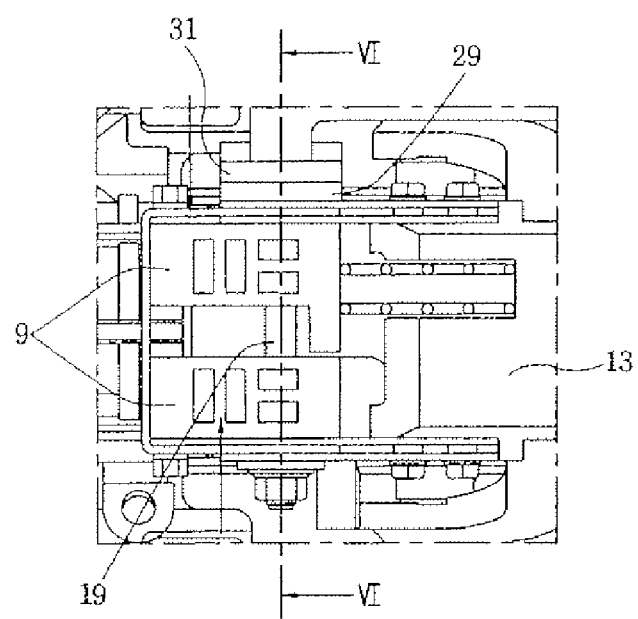
FIG. 4 is an enlarged view of an operation lever and a cam.
Figure 5:
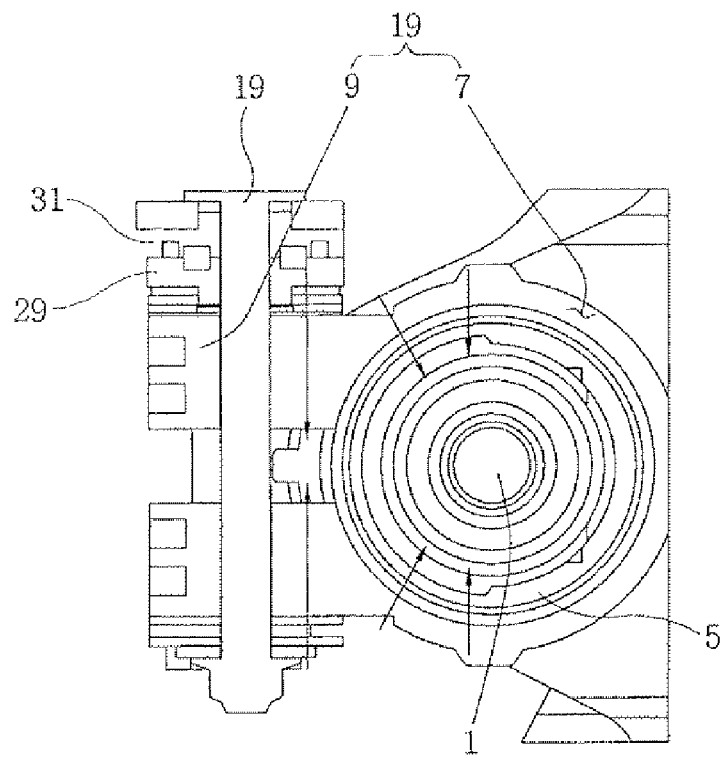
FIG. 5 is a cross-sectional view taken along the line VI-VI of FIG 4.

An exemplary locking structure is shown in the FIGs. A main housing 3 is disposed around a steering shaft 1 and fixed to a car body. An insert pipe 5 protrudes backward from main housing 3. A sliding housing 11 has an arc portion 7 surrounding insert pipe 5, having a tightening block 9 at each end, and changing in inner diameter by changes in distance between the tightening blocks 9. An upper housing 13 is vertically rotatable relative to sliding housing 11. A tilt plate 17 is fixed to upper housing 13, extends to a side of tightening block 9 of sliding housing 11, and has an arc-shaped slot 15 corresponding to rotation distance of tilt plate 17 relative to tightening block 9. A locking bolt 19 passes through arc-shaped slot 15 of tilt plate 17 and tightening blocks 9. An operation lever 21 is rotatably fitted on locking bolt 19. A cam assembly tilts plates 17 and tightening blocks 9 according to a rotation distance of operation lever 21.

When the force exerted to tilt plates 17 and tightening blocks 9 through the cam assembly is reduced as operation lever 21 rotates, sliding housing 11 slides forward and backward on insert pipe 5 to telescopic-ally operate, while upper housing 13 rotates up and down with respect to sliding housing 11 to tilt. Contrarily, when the force exerted by the cam assembly increases as operation lever 21 rotates, the telescopic operation and tilting is restricted.

A steering column is usually disposed at an angle in a vehicle. Therefore, "forward" herein means axially forward along the steering column, generally toward the front of the vehicle and down, whereas "backward" generally means backward and upward.

A guide bracket 23 covers the front and both sides of tightening blocks 9 of sliding housing 11. Tilt bracket 17 is disposed between tightening block 9 and guide bracket 23. Further, an additional tilt plate 25 that is disposed outside tilt plate 17, fixed to upper housing 13, and has an arc-shaped slot 15 the same as the above-mentioned arc-shaped slot 15 is disposed such that a portion with arc-shaped slot 15 is in contact with the outside of guide bracket 23. Furthermore, locking bolt 19 passes through all of tightening blocks 9, tilt plates 17, guide bracket 23, and additional tilt plates 25.

It is advantageous in terms of manufacturing to provide tilt plate 17 and additional tilt plate 25 in the same shape, but the present invention is not limited thereto. Spacers 27 are disposed between tilt plate 17 and additional tilt plate 25, where tilt plate 17 and additional lilt plate 25 are fixed to upper housing 13, to compensate for the thickness of guide bracket 23.

Guide bracket 23 is U-shaped and locking bolt 19 passes through the rear portion of tightening block 9. Further, the front portion of tightening block 9 is Fixed to guide bracket 23 by a bolt 33 that is screwed through a side of guide bracket 23.

Therefore, guide bracket 23 limits the maximum allowable distance between tightening blocks 9, and as tightening blocks 9 move toward each other by locking bolt 19 and the cam assembly, guide bracket 23 compensates for the change in distance between tightening blocks 9 by elastically deforming.

The maximum allowable distance between tightening blocks 9 by guide bracket 23 is appropriately set such that sliding housing 11 can freely slide on insert pipe 5 when tightening blocks 9 arc not pressed by locking bolt 19 and the cam assembly.

The cam assembly may include a fixed cam 29 that locking bolt 19 passes through and a portion of which is inserted in arc-shaped slot 15 of additional tilt plate 25 to prevent rotating; and a movable cam 31 that is in contact with fixed cam 29 and has an integral cam block such that driving cam 31 moves away from or close to fixed cam 29 while rotating relative to fixed cam 29. Further, driving cam 31 is rotated by operation lever 21.

That is, a locking nut 35 is screwed at an end of locking bolt 19 and the distance between the head of locking bolt 19 and locking nut 35 is not changed by calking. Therefore, as movable cam 31 is rotated by rotation of operation lever 21 and the distance between movable cam 31 and fixed cam 29 is changed, the gaps between tightening blocks 9, tilt plates 17, guide brackets 23, and additional tilt bracket 25 are changed, thereby affecting the pressing-contact between them.

The operation of a locking structure having the above configuration according to an embodiment of the invention is described hereafter.

As movable cam 31 is rotated relative to fixed cam 29 by rotation of operation lever 21, the distance between movable cam 31 and fixed cam 29 is reduced and the distances between tightening blocks 9, tilt plate 17, guide bracket 23, and additional tilt plates 25 increase. Accordingly, friction forces between them significantly decrease and they are unlocked, i.e. can freely move relative to each other.

Figure 6:
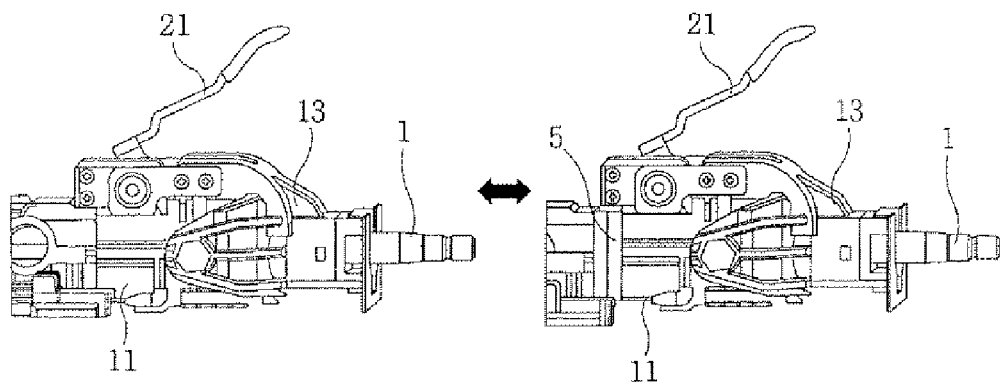
FIG. 6 illustrates telescopic operation according to an embodiment of the invention.
Figure 7:
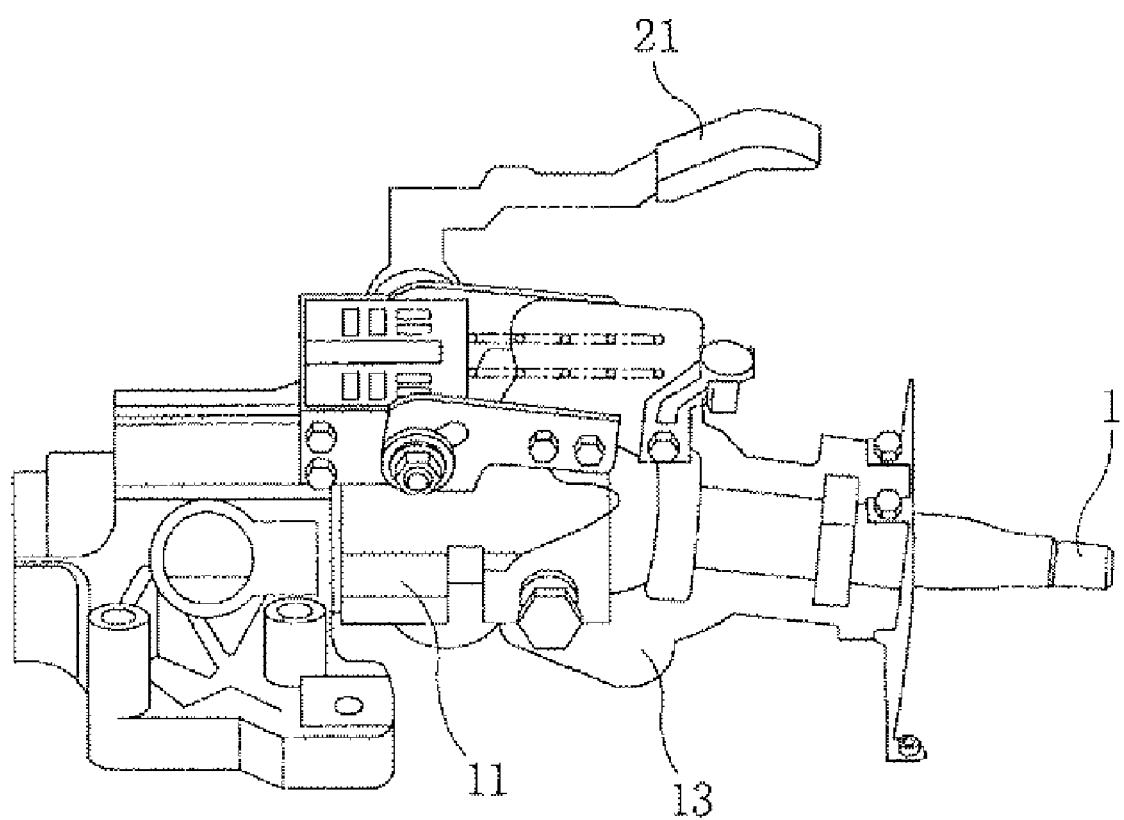
FIG. 7 illustrates tiling operation according to an embodiment of the invention.

When they are unlocked, as shown in FIG. 6, the steering wheel can be telescopically moved by moving sliding housing 11 forward or backward on insert pipe 5, and can be tilted by rotating upper housing 13 up or down relative to sliding housing 11 as shown in FIG. 7.

As operation lever 21 returns to its initial position, movable cam 31 moves away from fixed cam 29 while rotating, such that the distances between tightening blocks 9, tilt plate 17, guide bracket 23, and additional tilt plates 25 decrease and they press each other; therefore, relative motions are restricted by friction and the steering wheel is locked.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A locking structure of a steering column, comprising:
   a main housing that is disposed around a steering shaft and configured to be fixed to a car body;
   an insert pipe that protrudes backward from the main housing;
   a sliding housing that has an arc portion at least substantially surrounding the insert pipe, having a tightening block at each end, and having a variable inner cross-section that changes with changes in distance between the tightening blocks;
   an upper housing that is tiltable relative to the sliding housing;
   a tilt plate that is fixed to the upper housing, extends to a side of the tightening block of the sliding housing, and has an arc-shaped slot corresponding to a rotation distance of the tilt plate relative to the tightening block;
   a locking bolt that passes through the arc-shaped slot of the lilt plate and through the tightening blocks;
   an operation lever that is rotatably fitted on the locking bolt; and
   a cam assembly that variably applies a force to the tilt plates and the tightening blocks according to a rotation distance of the operation lever.

2. The locking structure as defined in claim 1, further comprising:
   a guide bracket that covers the front and both sides of the tightening blocks of the sliding housing, wherein the tilt bracket is disposed between the tightening block and the guide bracket; and
   an additional tilt plate that is disposed outside the tilt plate, fixed to the upper housing, and has an arc-shaped slot at a portion of the additional tilt plate that is in contact with the guide bracket;
   wherein the locking bolt passes through the guide bracket and the additional tilt plates.

3. The locking structure as defined in claim 2, wherein the guide bracket is substantially U-shaped,
   the locking bolt passes through a rear portion of the tightening block, and
   a front portion of the tightening block is fixed to the guide bracket by a bolt.

4. The locking structure as defined in claim 2, wherein the cam assembly comprises:
   a fixed cam through which the locking bolt passes and a portion of which is inserted in the arc-shaped slot of the additional tilt plate to prevent rotating; and
   a movable cam that is in contact with the fixed cam, such that the movable cam moves towards or away from the fixed cam while rotating relative to the fixed cam, and is rotated by the operation lever.

* * * * *

UNITED STATES PATENT AND TRADEMARK OFFICE
CERTIFICATE OF CORRECTION

PATENT NO. : 7,611,166 B2  
APPLICATION NO. : 11/965478  
DATED : November 3, 2009  
INVENTOR(S) : Donghan Lee Page 1 of 1

It is certified that error appears in the above-identified patent and that said Letters Patent is hereby corrected as shown below:

Title Page; item (73);  
Change the Assignee section from

"Assignee: Hyundai Motor Company, Seoul (KR)"

to

--Assignees: Hyundai Motor Company, Seoul (KR)  
Kia Motors Corporation, Seoul (KR)--.

Signed and Sealed this

Third Day of August, 2010

David J. Kappos  
*Director of the United States Patent and Trademark Office*